(12) United States Patent
Feyh et al.

(10) Patent No.: US 9,557,222 B2
(45) Date of Patent: Jan. 31, 2017

(54) PORTABLE DEVICE WITH TEMPERATURE SENSING

(71) Applicant: Robert Bosch GmbH, Stuttgart (DE)

(72) Inventors: Ando Feyh, Palo Alto, CA (US); Gary O'Brien, Palo Alto, CA (US); Gary Yama, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 14/199,480

(22) Filed: Mar. 6, 2014

(65) Prior Publication Data

US 2014/0314120 A1 Oct. 23, 2014

Related U.S. Application Data

(60) Provisional application No. 61/789,661, filed on Mar. 15, 2013.

(51) Int. Cl.
*G01J 5/50* (2006.01)
*G01J 5/08* (2006.01)
(Continued)

(52) U.S. Cl.
CPC .............. *G01J 5/505* (2013.01); *G01J 5/089* (2013.01); *G01J 5/0859* (2013.01); *G01J 5/20* (2013.01); *G01J 2005/0077* (2013.01)

(58) Field of Classification Search
CPC .............. G01J 5/505; G01J 5/089; G01J 5/20; G01J 5/0859; G01J 2005/0077
(Continued)

(56) References Cited

U.S. PATENT DOCUMENTS

| 8,275,413 B1 | 9/2012 | Fraden et al. |
| 2002/0017997 A1* | 2/2002 | Felkowitz .............. G01K 1/024 340/573.1 |

(Continued)

FOREIGN PATENT DOCUMENTS

| KR | 10-2005-0000269 A | 1/2005 |
| KR | 10-2006-0031041 A | 4/2006 |
| KR | 10-2006-0062126 A | 6/2006 |

OTHER PUBLICATIONS

International Search Report and Written Opinion corresponding to PCT Application No. PCT/US2014/021697, mailed Jun. 13, 2014 (11 pages).

*Primary Examiner* — Lisa Caputo
*Assistant Examiner* — Philip Cotey
(74) *Attorney, Agent, or Firm* — Maginot Moore & Beck LLP

(57) ABSTRACT

A hand-held device having a housing and a processor disposed within the housing, includes a camera and a temperature sensing element having an adjustable field of view. The camera is configured to generate an image of an object and to permit the user to frame the image at a portion of the object to determine the temperature of the framed portion. The temperature sensing element includes a plurality of temperature sensors and the processor is configured to select ones of the plurality of sensors to produce a field of view (FOV) of the temperature sensing element that is less than or equal to the frame in the image. The selected sensors are activated to generate signals corresponding to the temperature of the object in the FOV and the processor is configured to determine a sensed temperature based on the sensor signals.

11 Claims, 8 Drawing Sheets

(51) Int. Cl.
*G01J 5/20* (2006.01)
*G01J 5/00* (2006.01)

(58) Field of Classification Search
USPC .......................................................... 374/121
See application file for complete search history.

(56) References Cited

U.S. PATENT DOCUMENTS

| | | | |
|---|---|---|---|
| 2004/0217264 A1* | 11/2004 | Wood .................. | G01B 11/272 250/214 R |
| 2005/0117049 A1* | 6/2005 | Suzuki ............... | H04N 5/23212 348/345 |
| 2007/0018105 A1* | 1/2007 | Grimberg .................. | G01J 5/22 250/349 |
| 2007/0046287 A1 | 3/2007 | Vervaeke et al. | |
| 2010/0163730 A1* | 7/2010 | Schmidt ................ | G01J 5/0066 250/334 |
| 2011/0221599 A1* | 9/2011 | Hogasten .......... | H01L 27/14609 340/632 |
| 2011/0303847 A1* | 12/2011 | Kurashina ................ | G01J 5/02 250/338.4 |
| 2012/0320189 A1* | 12/2012 | Stuart ..................... | G01J 5/025 348/135 |
| 2013/0016203 A1* | 1/2013 | Saylor ................ | G06K 9/00604 348/78 |
| 2013/0048855 A1* | 2/2013 | Abreo ..................... | H04N 5/33 250/330 |
| 2013/0204570 A1* | 8/2013 | Mendelson ........... | G01J 5/0025 702/135 |

* cited by examiner

PORTABLE DEVICE WITH TEMPERATURE SENSING

REFERENCE TO RELATED APPLICATION AND PRIORITY CLAIM

The present application is a utility filing of and claims priority to U.S. Provisional Application No. 61/789,661, filed on Mar. 15, 2013, the disclosure of which is expressly incorporated herein in its entirety.

FIELD

The present disclosure relates generally to portable devices, such as portable phones or tablets, and more particularly to portable devices incorporating touchless temperature sensing

BACKGROUND

Portable electronic devices such as cellular telephones are ubiquitous in many societies. The rise in popularity of portable electronic devices can be attributed, at least in part, to the ever-lowering expense of the devices. In many instances, such as smart-phones and tablets, the popularity of the devices is further attributable to the ever-increasing functionality of the devices. For example, telephones commonly include cameras, GPS receivers, inertial sensors and a number of applications many of which bear little relationship to a communications system.

While many of the functionalities may provide only entertainment value, some functionalities are more practical. Incorporation of a GPS receiver, for example, when combined with a web browser application allows an individual to virtually instantly obtain directions to a location of interest.

Although a wide variety of applications and functionalities are provided in mobile devices, additional capabilities are desirable. By way of example, mobile devices can be used to obtain weather information, including near-real-time radar of the area in which a user is located. Thus, a user can determine that a front is approaching, that rain is expected, and that temperatures will be falling below freezing. The actual temperature in the vicinity of the user can also be obtained. Even with all of that information, however, the user cannot be sure if a wet-looking pavement is simply damp or is covered with so-called "black ice" since pavement may be below freezing while the air temperature is above freezing.

What is needed is a system that can be used to determine the temperature of an object, virtually anywhere at any time.

SUMMARY

The present disclosure contemplates hand-held device, such as a cell phone, smart phone or tablet, having a housing and a processor disposed within the housing, as well as a camera and a temperature sensing element having an adjustable field of view. The camera is configured to generate an image of an object and to permit the user to frame the image at a portion of the object to determine the temperature of the framed portion. The temperature sensing element includes a plurality of temperature sensors and the processor is configured to select ones of the plurality of sensors to produce a field of view (FOV) of the temperature sensing element that is less than or equal to the frame in the image. The selected sensors are activated to generate signals corresponding to the temperature of the object in the FOV and the processor is configured to determine a sensed temperature based on the sensor signals. The device may include a sensible output, such as a visual display of the temperature value for the region of the object within the FOV.

DETAILED DESCRIPTION

Figure 1:
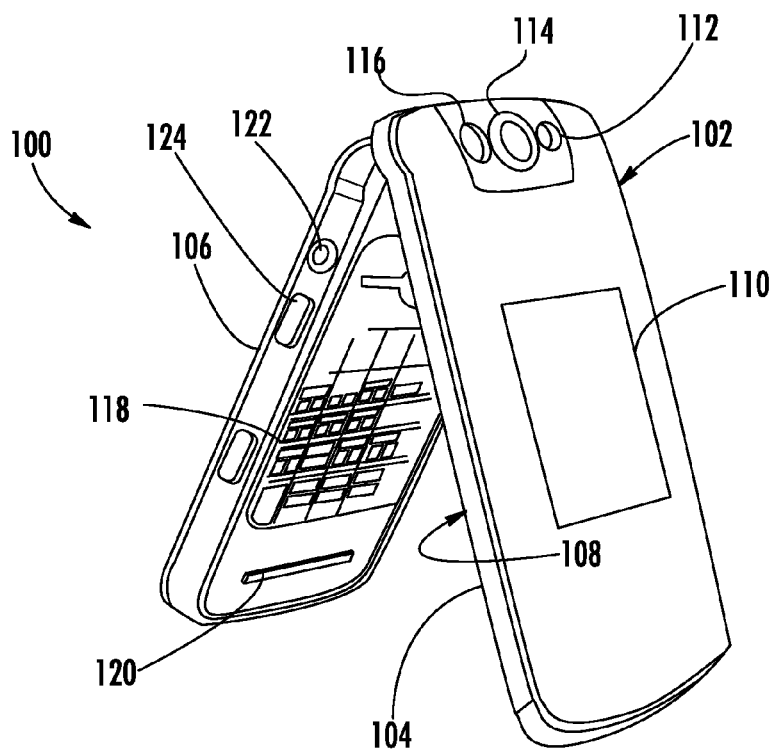
FIG. 1 is a perspective view of a portable device that may incorporate the temperature sensing features described herein.

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one skilled in the art to which this document pertains Referring to FIG. 1, a portable device is depicted, generally designated 100, which may be a cellular telephone as shown. In this embodiment, the portable device 100 has a housing 102 that includes an upper housing portion 104 and a lower housing portion 106. An inner display 108 is located on the inner side of the upper housing portion 104 and an outer display 110 is located on the outer side of the upper housing portion 104. The lower housing portion 106 includes a keyboard 118, a microphone port 120, a data port 122 and a charging port 124. The outer side of the upper housing portion 104 further includes a camera port 114 and a light port 116 that are operatively positioned so that the user can point the ports toward an object or scene. In one aspect of the present disclosure, a thermal sensor port 112 is also included in the upper housing portion 104, ad may be positioned adjacent the camera and light ports so that the user can point the thermal sensor port 112 toward an object.

It is understood that the portable phone of FIG. 1 is merely exemplary of a portable device that can implement the thermal sensing features described herein. The portable phone 100 may have other configurations, such as that of a "smart" phone, or may be in the form of a portable tablet, PDA or like device. The displays 104, 108 may be modified on the particular portable device, and the device may omit certain elements of the phone 100, such as the keyboard, microphone, data port, etc. For certain embodiments of the portable device described herein, the device retains a display, the camera port and the thermal sensor port.

Figure 2:
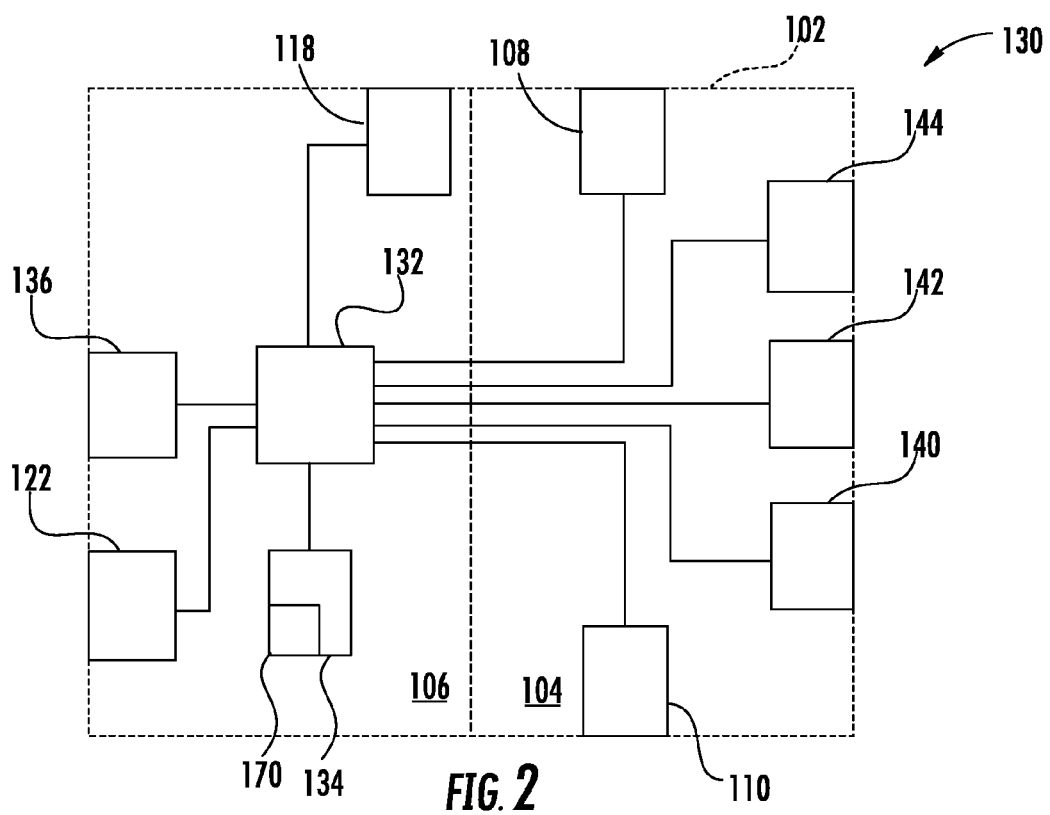
FIG. 2 is a block diagram of the electronic components of the portable device shown in FIG. 1.

A control circuit 130 for the device 100 is depicted in FIG. 2 which is located within the housing 102. The control circuit 130 includes a processor 132 and a memory 134, with the processor in communication with the components of the device, as well as to an internal power source 136. Program instructions 170 are stored in the memory and are executed by the processor to achieve the various functionalities of the device. The processor 132 is further operably connected to a thermal sensor assembly 140, a charge coupling device (CCD) 142 and a light 144 which may be physically located adjacent to and/or disposed within the thermal sensor port 112, the camera port 114 and the light port 116, respectively. The program instructions 170 include commands which, when executed by the processor 132, cause the portable device 100 to obtain data for use in determining the temperature of an object within a field of view of the thermal sensor assembly 140 and to process that data to produce an output sensible by the user, such as on a display 108, 110. The sensible display may be in other forms, such as an indicator light that is illuminated for certain sensed temperatures, or an audible signal, such as an alarm or a verbal expression of the temperature.

Figure 3:
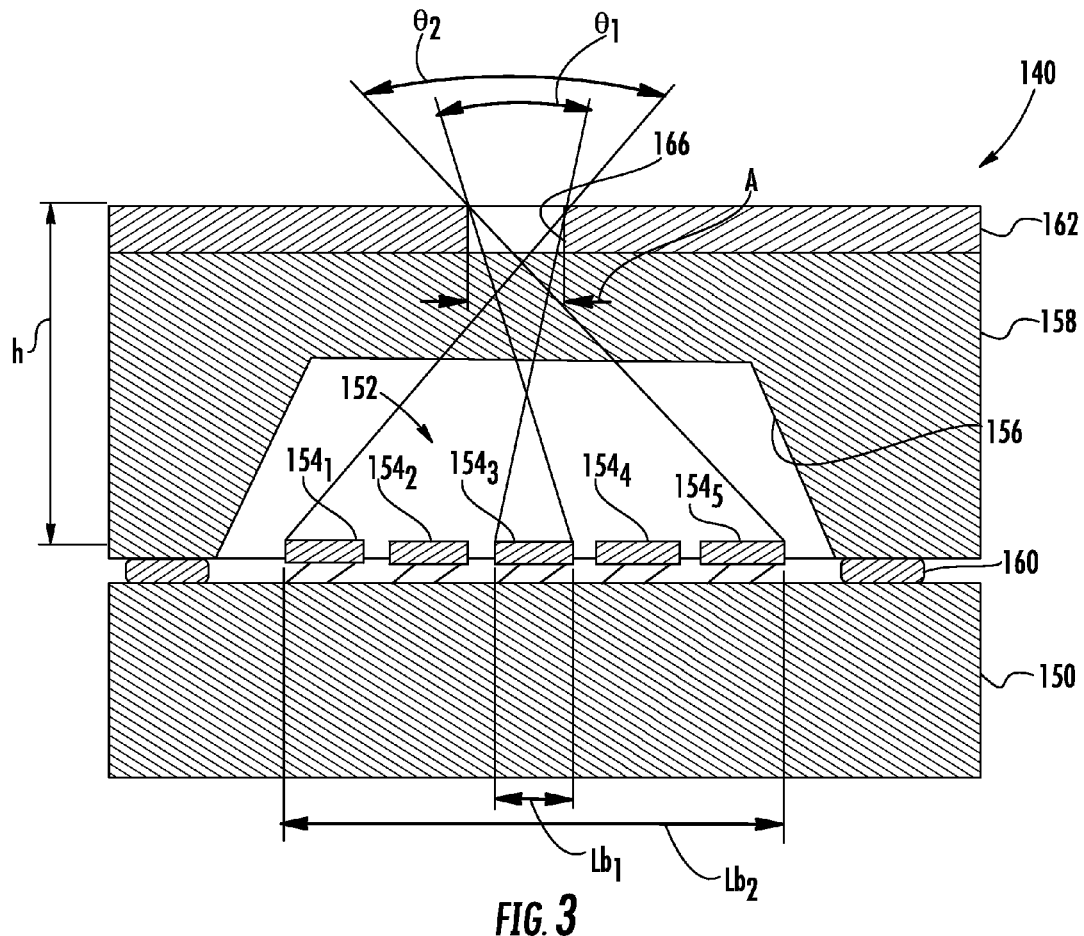
FIG. 3 depicts a side cross-sectional view of a thermal sensor assembly according to the present disclosure.

One embodiment of the thermal sensor assembly 140, as shown in further detail in FIG. 3, includes a substrate 150 and an array 152 of thermal sensors $154_{1-5}$. In some embodiments, the array 152 may be a single pixel, or may include more or less than the five sensors depicted in the figure. Moreover, although the sensors $154_{1-5}$ are depicted in a line, a two-dimensional array of sensors may be provided with multiple rows of sensors $154_{1-5}$. The array 152 is located within a chamber 156 defined in part by a cap 158 which may be bonded to the substrate 150 with a hermetic seal 160. The cap may be in the form of a silicon wafer. A thin metallic film 162 may be deposited on an outer surface 164 of the cap 158 to define an aperture 166 that is used to determine the field of view of the sensor assembly.

In accordance with one aspect of the present disclosure, the thermal sensors $154_{1-5}$ are each a sensor capable of detecting long wavelength infrared radiation (LWIR). In a specific embodiment the sensors are bolometers generally configured as shown in the detail view of FIG. 4. The bolometer sensors $154_i$ include a thin-film resistive metal layer 180 that has resistance properties responsive to temperature changes and that has adequate thermal absorption properties. The metal layer 180 has a thickness on the nanometer scale and is efficiently applied to an amorphous substrate by atomic layer deposition (ALD). For instance, the metal layer may be a platinum layer of 5 nm thickness applied to an amorphous silicon substrate. Other metals may be used that have the appropriate resistance-temperature and thermal absorption characteristics, such as vanadium oxide.

Figure 4:
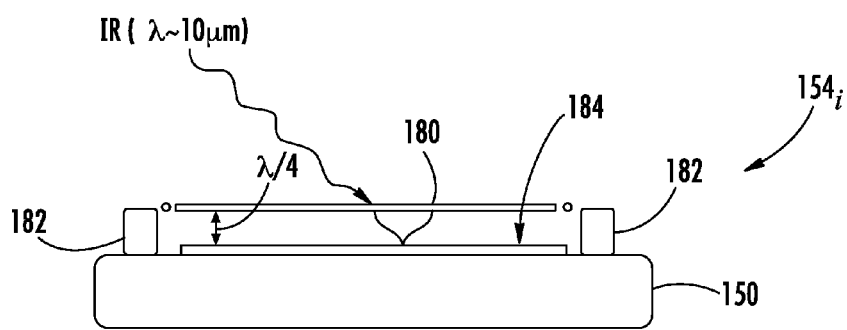
FIG. 4 is an enlarged side view of a sensor element of the thermal sensor assembly shown in FIG. 3.
Figure 5:
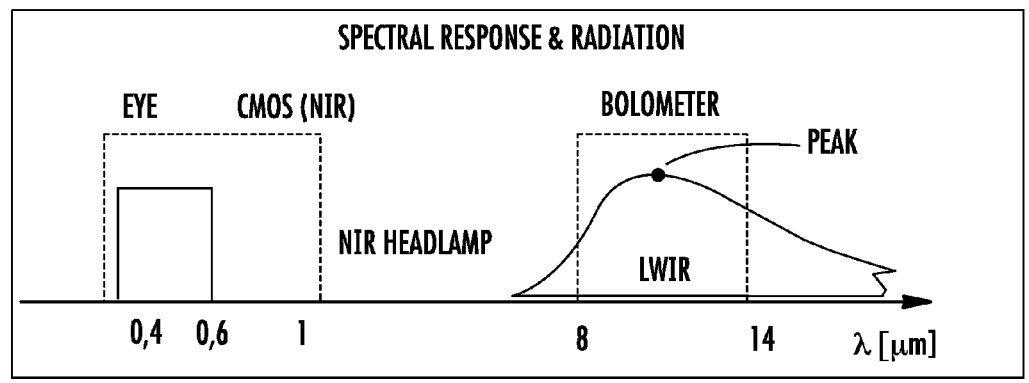
FIG. 5 includes graphs of spectral response and transmittance as a function of radiation wavelength.
Figure 5:
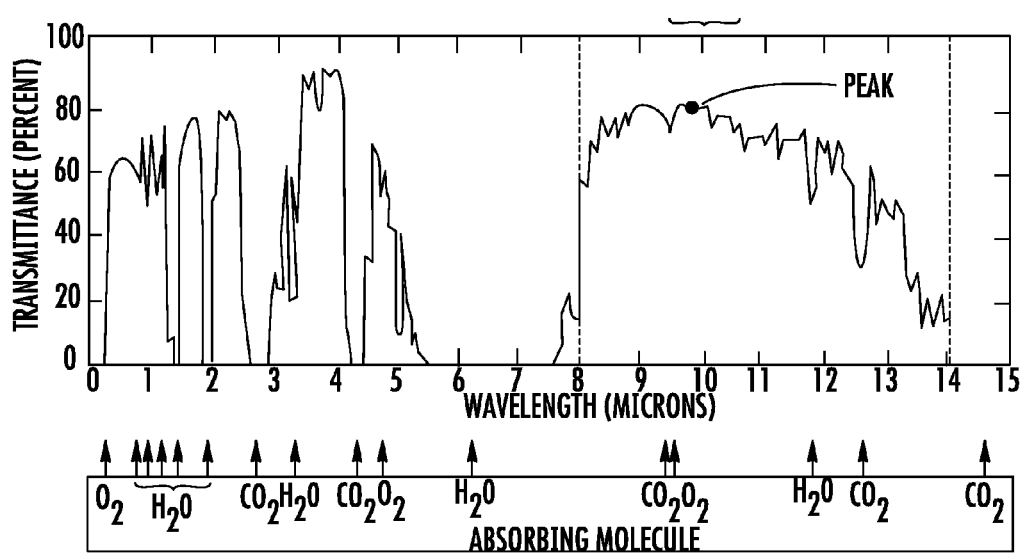

As shown in FIG. 4, the ALD metal layer 180 is supported on a mounting substrate, such as the substrate 150 by metal anchors 182. The anchors are sized to support the metal layer above a mirror 184. The metal layer is supported at a height that is approximately one quarter of the sensed wavelength (i.e., $\lambda/4$), where the wavelength $\lambda$ is in the infrared range. LWIR radiation falls within the wavelength range of 8-14 µm, with an apparent peak of spectral response and transmittance at about 10 µm, as reflected in the graphs of FIG. 5. Thus, in one specific embodiment the metal layer 180 is supported above the mirror at a height equal to one quarter of a 10 µm wavelength, or 2.5 µm. The mirror 184 increases absorption of thermal energy or IR radiation by the metal layer 180.

Figure 6:
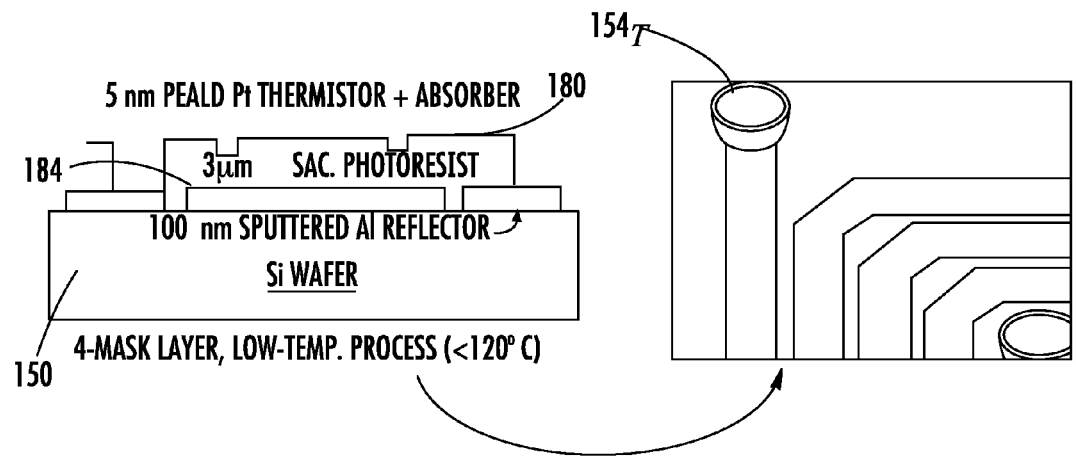
FIG. 6 is an SEM picture and schematic diagram of a thermal sensor assembly of FIG. 4 produced according to one method of manufacture.
Figure 7:
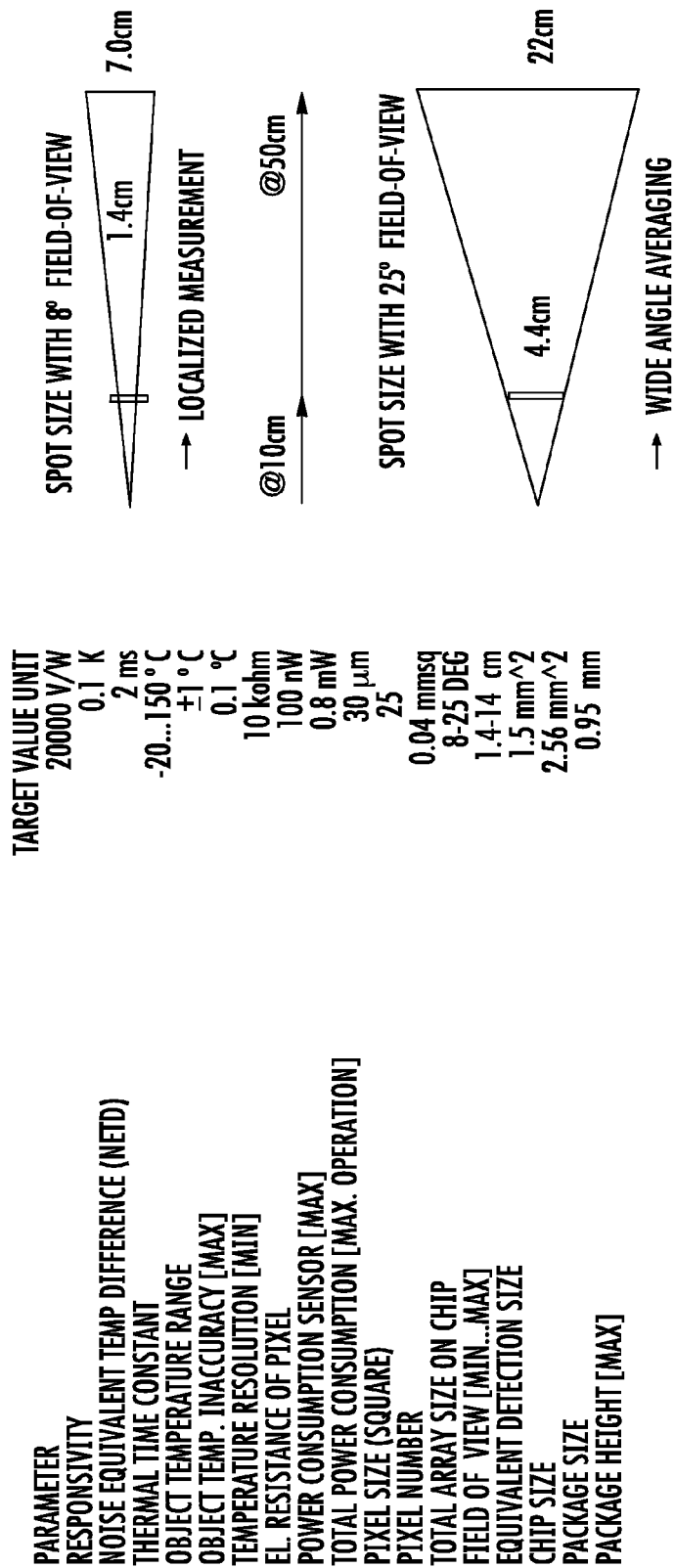
FIG. 7 is a chart of features and performance attributes of a thermal sensor assembly according to features of the present disclosure.

A scanning electron microscopic image of a suitable bolometer structure for the present sensor assembly is shown in FIG. 6. In this example, an aluminum reflector/mirror is sputtered onto a thermally oxidized silicon wafer at a thickness of about 100 nm. A 3 µm sacrificial photoresist layer, or other suitable sacrificial layer, is provided to support a 5 nm thick platinum layer deposited by ALD. The array of bolometers (i.e., sensors $154_1$) can have a dimension of 5×5 pixels or in the range of 30×30 µm² per pixel. The use of platinum as the metal layer 180 provides a good temperature coefficient resistance and low electric noise. The use of ALD allows for controllable nanometer thickness conformal deposition. If necessary, stiffening elements may be added for structural control of the nanometer metal film. The chart of FIG. 7 lists desirable performance parameters that can be achieved by bolometer sensors produced as described above.

Figure 8:
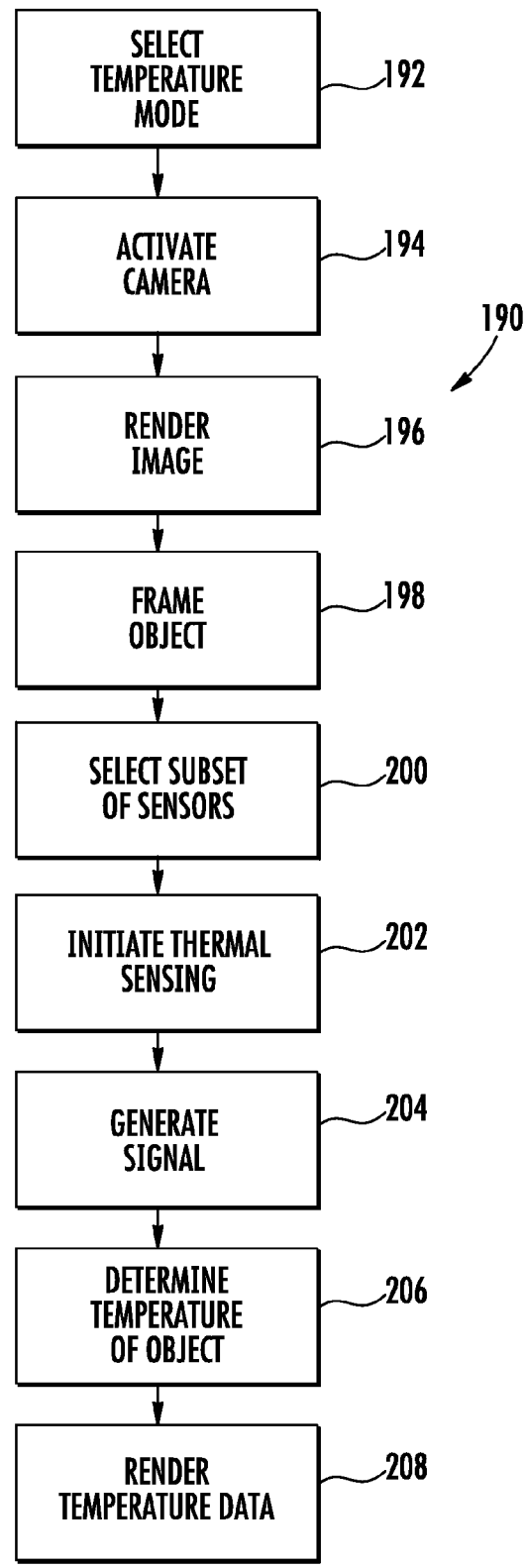
FIG. 8 is a flowchart of software executed by the processor of the device depicted in FIGS. 1-2 to perform the temperature sensing functions described herein.

Referring to FIG. 8, there is depicted a flowchart or a process, generally designated 190, setting forth an exemplary manner of obtaining data for use in determining the temperature of an object within a field of view of the thermal sensor assembly 140 by executing the program instructions 170 according to the present principles. Initially, a user carrying the portable device 100 places the portable device 100 in a temperature detection mode (block 192) in a suitable manner, such as by keyboard entry or pressing an activation button. In embodiments which are configured solely for temperature detection, the device may only need to be energized. In embodiments such as the portable device 100, the display 108 in some embodiments may be configured to display a menu which the user uses to activate the temperature detection mode.

Once the portable device 100 is placed in temperature detection mode, the processor 132 may activate or energize the CCD camera 142 to an energized condition (block 194). In response, the CCD 142 begins to detect incoming energy, such as light energy, in any acceptable manner and generates a signal indicative of the sensed energy. The processor 132 receives the generated signal and controls a display 108, 110 to render the scene viewed (or sensed) by the CCD 142 (block 196).

Figure 9:
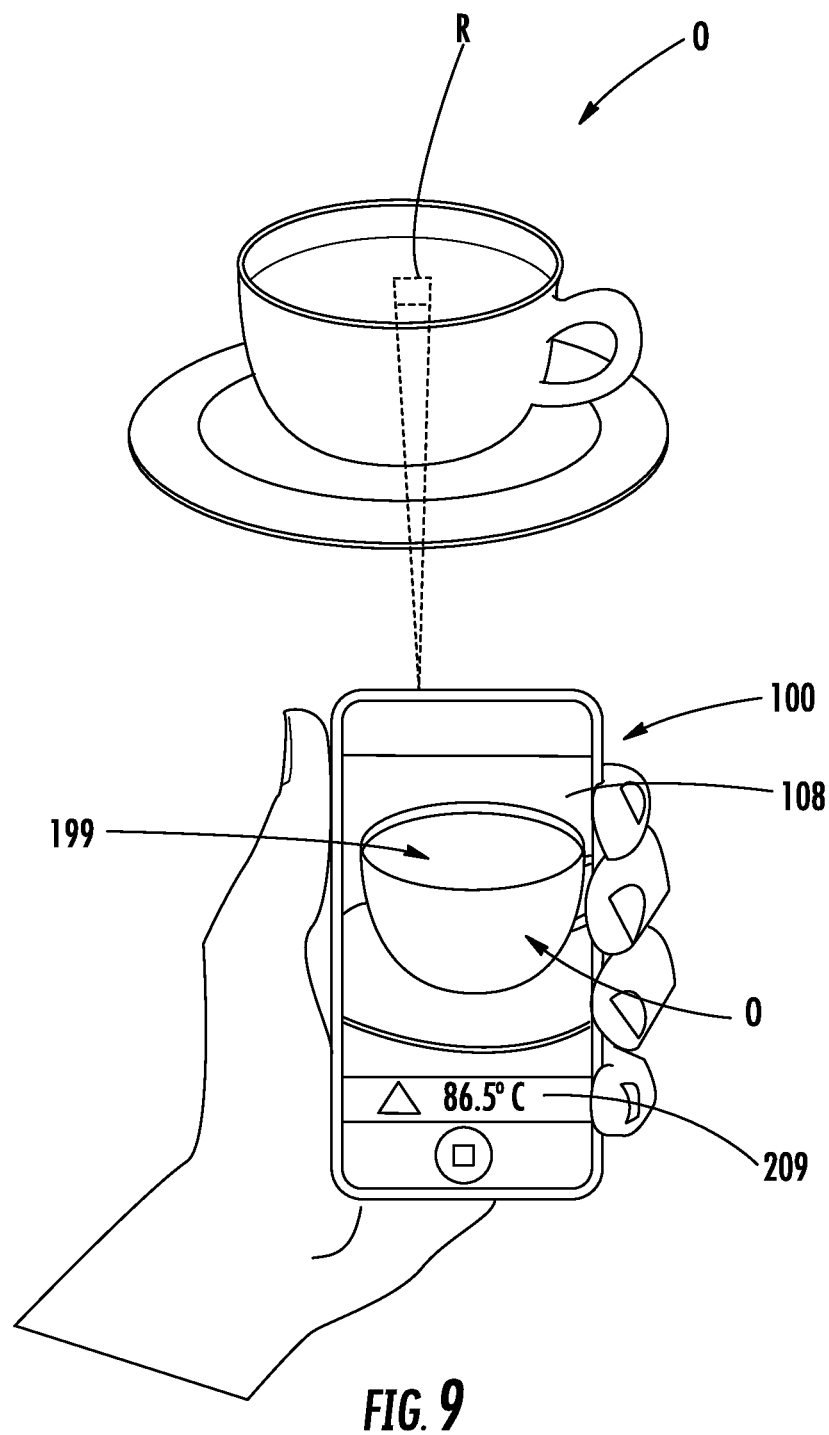
FIG. 9 is a pictorial representation of the use of the thermal sensing feature described herein to sense the temperature of a cup of coffee.

Using the rendered image as a guide, the user frames the desired scene/object from within the picture generated by the CCD (block 198). Framing of the object in some embodiments is accomplished by zooming the display such that the object fills the display 104, 108. In other embodiments, a shadow frame overlying the viewed scene is manipulated to frame the object. An example is depicted in FIG. 9 in which a user is viewing a cup of hot coffee, the object O, on the display 108 of the device 100, which in the depiction is a "smart" phone. The software 170 is operable to generate a shadow frame 199 corresponding to a region R on the object O. As the user moves the device 100 relative to the object, the shadow frame 199 also moves. As the object is framed, using the inner display for instance, the processor selects a subset of the thermal sensors $154_{1-5}$ in the array 152 that are needed to view the framed region. By varying the number of active sensors or pixels (if each is a separate pixel), the field of view (FOV) of the thermal sensor assembly 140 is adjusted to comport with the framing of the object in the display (block 200). More specifically, the software executed by the processor of the device is adapted to select ones of the sensors necessary to provide an FOV that is approximately equal to the frame provided around the object by the camera. Preferably the FOV does not exceed the object frame so that extraneous temperature signals do not affect the detected temperature of the desired portion of the object.

For example, each sensor $154_{1-5}$ has an image length $Lb_i$ so the total or active base-length (Lb) of the array 152 (FIG. 3) can be varied by selecting less than all of the sensors to be activated. As depicted in FIG. 3, the aperture 166 is located at a distance (h) from the thermal sensors $154_{1-5}$, and has an opening dimension (diameter) defined as "A". If only thermal sensor $154_3$ is selected, the resulting FOV is defined as the angle $\theta_1$ with a short active base length ($Lb_1$). By selecting additional thermal sensors $154_x$, e.g. subset of thermal sensors including thermal sensors $154_{1-5}$, the FOV is expanded to $\theta_2$ with a correspondingly longer active base length ($Lb_2$).

The FOV (neglecting diffraction) is approximated as tan (A/2)=(Lb/2+A/2)/h. In one embodiment, "h" is about 200-500 microns, "A" is about 50-100 microns, and "Lb" is adjustable between about 15 microns and 1000 microns. Consequently, values for "$\theta$" are between 1 and 150 degrees, depending on the defined values. For an aperture dimension A of 50 micron, h of 300 micron, and Lb between 20 and 200 micron, $\theta$ is adjustable between angles of 13 and 45 degrees. Therefore the sensing area of the array 152 can be adjusted in order to have a smaller or larger area of detection at a given distance. The sensors are preferably, but not necessarily, selected to be symmetric about the aperture 166 to provide a symmetric FOV relative to the aperture. The software executed by the processor may be configured to select sensors to provide an FOV that is less than or equal to the dimensions of the frame generated about the object O by the camera and associated software instructions. In this way, the temperature sensors only sense the temperature in the desired region of the object. The temperature data generated by these sensors is thus not contaminated by temperatures of the object outside the desired frame. For instance, in the example depicted in FIG. 9 the user desires to determine the temperature of the liquid within the cup. The user thus establishes a frame that is limited to the liquid, as depicted in the figure. If the FOV of the sensors is large enough to include the cup itself, the necessarily cooler temperature of the cup will cause the device to register a temperature for the liquid that is lower than actual.

Once the object is framed and the subset of thermal sensors $154_{1-5}$ is selected, thermal data acquisition (block 202) is activated, whether automatically or by the operator pressing a key in the keyboard 118. In response, the processor 132 controls the sensor array 152 to generate a respective signal from each of the selected thermal sensors $154_{1-5}$ (block 204).

The processor 132 then determines a temperature for the object based upon the generated signals (block 206) and controls a display 108, 110 to render temperature data associated with the determined temperature (block 208). In some embodiments, the average temperature data is displayed on the display The temperature value may be obtained by a simple arithmetic average of the values from each of the sensors with an appropriate conversion applied, if necessary, to convert the sensor signal value to a temperature value. Other approaches or algorithms may be applied to convert the signals generated by each sensor into a value indicative of the actual temperature of the object O.

Thus, as depicted in FIG. 9 a temperature reading 209 may be displayed on display 108 concurrent with the picture of the object O generated by the camera CCD. The temperature reading corresponds to the temperature of the object within the shadow frame 199. It can be appreciated that as the user moves the device 100 so that the sensed region R also moves, the temperature reading will change according to the actual temperature of the newly sensed region. Thus, in the case of the coffee cup being examined in FIG. 9 it might be expected that moving the "smart" phone so that the region R is near the edge of the cup would show a change in temperature from the temperature sensed in the middle of the cup.

It is contemplated that the processor 132 executing the thermal sensing software 170 is a high-speed microprocessor of the type found in most handheld devices, so the steps shown in the flowchart of FIG. 8 can occur very rapidly and interactively as the user moves the device to focus on different regions R within an object O. It can be appreciated that the device 100 may thus be used as an interactive temperature scanner with a wide range of potential uses, such as to detect the temperature of a hot drink, as in the example of FIG. 9 so that the user doesn't burn his/her mouth, detecting heat sources in a building that might be indicative of a fire, or finding hot spots in a device that might be indicative of a potential device failure. The device 100 and temperature sensing feature may be used by an automotive, aerospace technician, or HVAC technician to detect an exhaust temperature to help diagnose a problem. The hand-held heat sensor capabilities may also be used to determine the temperature of a child or patient to help diagnose a medical condition.

Figure 10:
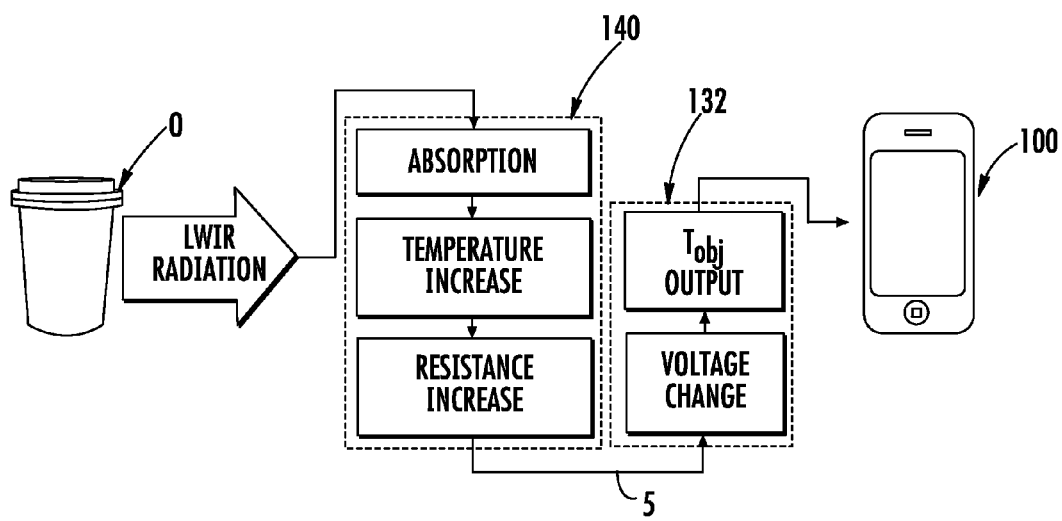
FIG. 10 is a functional block diagram showing the steps in the operation of the temperature sensing feature disclosed herein.

A block diagram representation of the temperature sensing events described in the flowchart of FIG. 8 is provided in FIG. 10. The device 100 is pointed to an object O that is emitting LWIR radiation, such as the cup of coffee depicted in the figure. The temperature sensor assembly 140 absorbs the radiation, which increases the temperature of the metal layer 180 of the selected sensors, which in turn produces an increased resistance in the sensor assembly. The processor 132 of the device senses this change in resistance, such as by a change in voltage across the sensor assembly. An integrated ASIC may condition the signal S received from the sensor assembly 180. The processor 132, and in particular the software 170 executed by the processor, evaluates the voltage change to determine the temperature of the object $T_{obj}$. This determination may be made in a number of ways, such as by using a look-up table, stored in memory 134, of temperature as a function of voltage change or voltage magnitude, or by an algorithm embodied in the software that converts the value of the sensor signal (such as a voltage magnitude) to a temperature value.

In different embodiments, the array of sensors in the thermal sensor assembly may take various forms. As shown in FIG. 3 the sensors may be in a linear array. In other embodiments the sensors may be in a rectangular, circular or oblong array with appropriate modifications to the aperture 166.

The temperature sensing features described herein allow the use of the portable device in a wide range of applications. In a simple example, the portable phone 100 may be used to sense the temperature of a beverage to ensure that it is safe to drink. The temperature sensing feature may also be used to determine body temperature of an infant or a patient, the local temperature of extremities of a person as an indication of blood circulation, or even the facial temperature of a person to evaluate emotional states. The device 100 may be used to detect hot spots in a building, such as by firefighters or other individuals to determine if there is a fire behind a closed door. Since the thermal sensor assembly 140 operates using LWIR radiation, the device does not require visible light, which means that the device can be used equally well in darkness or light. This attribute may open up avenues for use in gaming, such as in connection with an interactive gaming device or in connection with active gaming, such as paintball. The implementation of the temperature sensing feature in a portable device opens up the possible applications to the imagination of the user.

Figure 11:
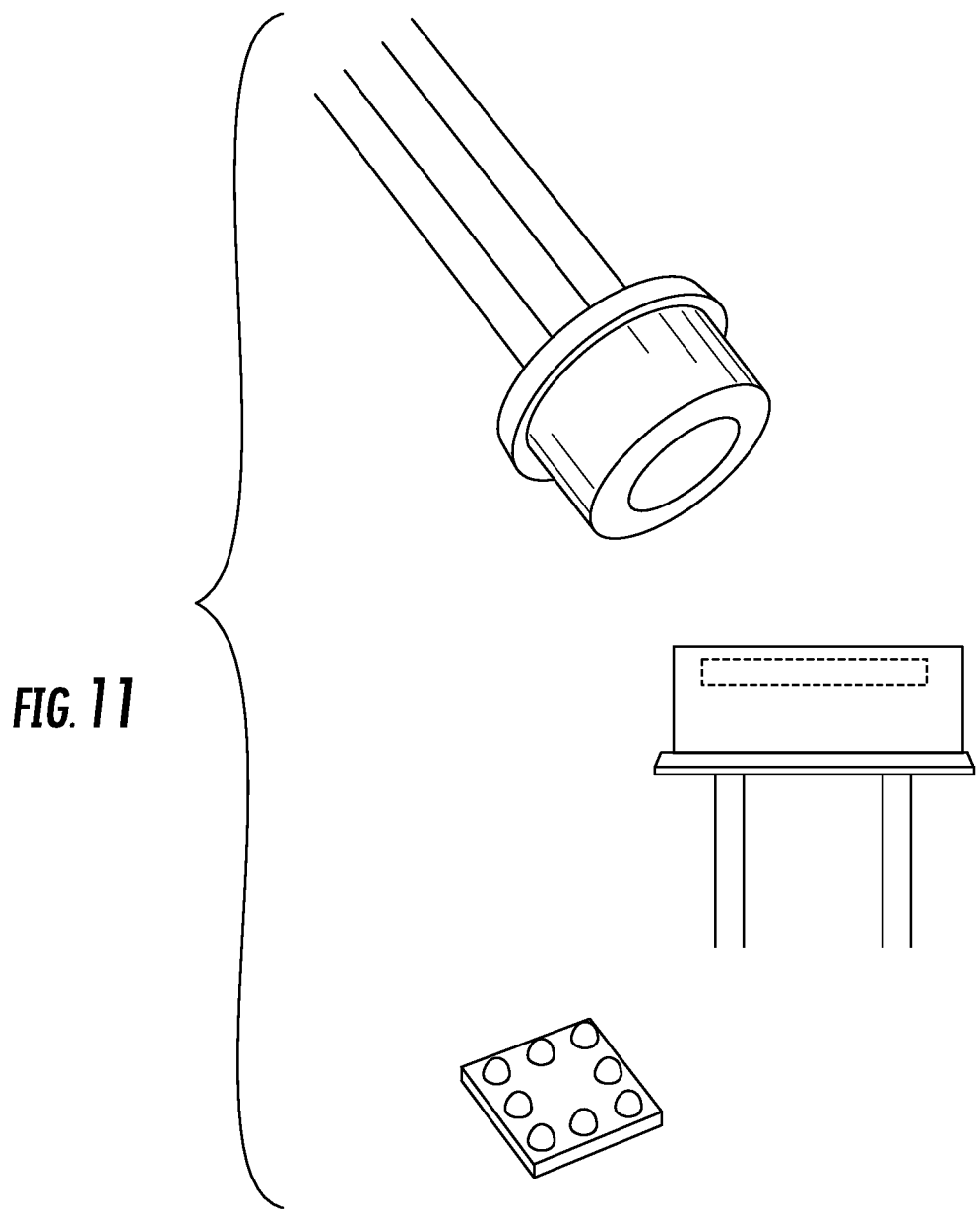
FIG. 11 illustrates alternative larger thermal sensors for use with portable devices.

In the embodiments described above, the temperature sensor assembly 140 is small and easily contained within the package of a conventional portable phone or "smart" phone. In other embodiments, a larger sensor may be incorporated into the device, such as the devices shown in FIG. 11. The illustrated devices are larger and in some cases have a greater range of detection than the bolometer sensors described herein. It is contemplated that the same or similar software 170 may be implemented to sense the temperature of an object using any of the devices shown in FIG. 11. It is contemplated that the larger sensor may have a greater range, much like heat sensing binoculars or cameras.

The present disclosure contemplates a portable temperature sensing system integrated into a portable device, such as a hand-held wireless phone, in which a thermal sensor assembly supported within the device housing includes an array of bolometer-type thermal sensor adapted to detect LWIR radiation emanating from an object. A processor and memory within the device evaluate signals from the sensor assembly to determine the temperature of the object and provide an output to the device user. Software executed by the processor allows the user to adjust the field of view of the sensor assembly based on the object being detected.

As discussed above, the temperature sensing system may be integrated into an existing hand-held device, such as the portable telephone shown in the illustrated embodiments, or into a device dedicated to the temperature sensing function. The device is portable and is preferably hand-held so that the user can accurately point the device to an object to be sensed.

In the illustrated embodiment, the signals from the temperature sensors 154₁ are evaluated by a software routine executed by the processor or microprocessor of the device 100. Alternatively, the signals from the temperature sensors may be processed by analog circuitry configured to convert he voltage or current signals from the sensors to a voltage or current operable to generate a sensible signal indicative of the temperature. As one example, the analog circuitry may be configured to generate a warning signal when the sensor signals exceed a predetermined value indicative of a dangerously high temperature.

What is claimed is:

1. A hand-held device having a housing adapted to be manually held by a user near an object and a processor disposed within said housing, and comprising:
   a port defined in said housing;
   a temperature sensing element having a field of view (FOV) disposed in said port and operable to generate one or more signals in response to the temperature of an object within the FOV;
   a sensible output; and
   software executed by the processor operable to convert the one or more signals from said temperature sensing element into a signal on said sensible output indicative of the sensed temperature,
   wherein the device is a cellular phone, smart phone or tablet.

2. The hand-held device of claim 1, wherein the temperature sensing element includes a plurality of sensors configured to sense long wavelength infrared radiation (LWIR).

3. The hand-held device of claim 2, wherein said plurality of sensors are bolometer sensors configured to provide an electrical signal in response to the temperature of the object.

4. The hand-held device of claim 3, wherein each bolometer sensor includes:
   a substrate;
   a reflective surface disposed on said substrate; and
   a metal layer formed of a metal configured to change resistance in response to a temperature change, said metal layer supported on said substrate offset from said reflective surface to receive LWIR reflected from said reflective surface.

5. The hand-held device of claim 4, wherein said metal layer is offset by a height that is ¼ the wavelength of the LWIR.

6. The hand-held device of claim 2, wherein the temperature sensing element further includes an aperture defined at said port and said plurality of sensors are supported on said device offset from said aperture, wherein said plurality of sensors are arranged to define a selectable field of view (FOV) through said aperture based on operation of selected ones of said plurality of sensors.

7. The hand-held device of claim 6, wherein said software is adapted to select ones of said plurality of sensors to provide a selected FOV for the temperature sensing element.

8. The hand-held device of claim 7, wherein said hand-held device further includes:
   a camera adjacent said temperature sensing element to generate an image of an object in the FOV defined by all of said plurality of temperature sensors;
   said software is executed by the processor to operate on said image to define a frame around a portion of the object in which the temperature is to be sensed; and
   said software is further executed by the software to select ones of the plurality of temperature sensors to produce an FOV that is less than or equal to the frame.

9. The hand-held device of claim 1, wherein the sensible output is a display screen and the software executed by the processor generates a temperature indicia for display on said display screen.

10. A method for sensing the temperature of an object with a hand-held device, wherein the device is a cellular phone, smart phone or tablet comprising:
    aiming a camera in the hand-held device at the object;
    generating an image of a region of the object using the camera;
    framing the region of the object to a desired portion of the region to obtain the temperature and generating a frame corresponding to the framed portion of the region;
    selecting a field of view of a temperature sensing element in the hand-held device that is less than or equal to the frame;
    actuating the temperature sensing element to sense the temperature in the field of view; and
    providing a sensible output through the hand-held device indicative of the sensed temperature in the field of view.

11. The method of claim 10, wherein:
the temperature sensing element includes a plurality of temperature sensors;
the step of selecting a field of view includes selecting ones of the plurality of sensors less than all of the plurality of sensors to define the field of view; and
the step of actuating the temperature sensing element includes actuating only the selected ones of the plurality of sensors.

* * * * *